United States Patent
Vokinger et al.

(10) Patent No.: US 9,638,550 B2
(45) Date of Patent: May 2, 2017

(54) ENCODER AND SENSOR SYSTEM HAVING PLURAL SENSORS AND ENCODER ELEMENTS FOR DETERMINING RELATIVE POSITIONS

(71) Applicant: HEXAGON TECHNOLOGY CENTER GMBH, Heerbrugg (CH)

(72) Inventors: Urs Vokinger, Au (CH); Heinz Lippuner, Rebstein (CH); Werner Amann, Feldkirch (AT); Knut Siercks, Mörschwil (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 95 days.

(21) Appl. No.: 14/625,318

(22) Filed: Feb. 18, 2015

(65) Prior Publication Data

US 2015/0233738 A1     Aug. 20, 2015

(30) Foreign Application Priority Data

Feb. 18, 2014  (EP) ..................................... 14155582

(51) Int. Cl.
   *G01D 5/347*    (2006.01)
(52) U.S. Cl.
   CPC ..... *G01D 5/34746* (2013.01); *G01D 5/34707* (2013.01)
(58) Field of Classification Search
   CPC .......... G01D 5/34707; G01D 5/34746; G01D 5/2457; G01D 5/2455; G01D 5/3473; H03M 1/308

(Continued)

(56) References Cited

U.S. PATENT DOCUMENTS 5,065,525 A    11/1991   Szenger
6,532,791 B2   3/2003    Schmid et al.
(Continued)

FOREIGN PATENT DOCUMENTS

CN     102338295 A    2/2012
CN     102706373 A    10/2012
(Continued)

OTHER PUBLICATIONS

Extended European Search Report dated Jul. 15, 2014 as received in Application No. 14155582.1.
(Continued)

*Primary Examiner* — Que T Le
(74) *Attorney, Agent, or Firm* — Maschoff Brennan

(57) ABSTRACT

System for determining relative positions comprising an encoder having encoder elements, and a sensor unit having a first sensor and at least one second sensor. The sensor unit and the encoder are movable relative to one another and their position relative to one another is determinable by the system. The first sensor and second sensor have a sensor distance with respect to one another. The sensor furthermore has a component composed of a dimensionally stable and aging-resistant material having a coefficient of thermal expansion which, in terms of absolute value, is in a range of 0 to $5 \cdot 10^{-6} K^{-1}$. The sensor distance is determinable highly precisely by the component by virtue of the component serving for the positional fixing of the sensors or by virtue of the component having a scale with the aid of which the sensor distance can be measured.

25 Claims, 6 Drawing Sheets

(58) Field of Classification Search
USPC ......... 250/231.13, 231.14, 221, 216, 231.16; 341/11, 13
See application file for complete search history.

(56) References Cited

U.S. PATENT DOCUMENTS

| | | | | |
|---|---|---|---|---|
| 8,182,065 | B2 * | 5/2012 | Grosse | B41J 19/202 347/37 |
| 2012/0007980 | A1 | 1/2012 | Gordon-Ingram | |

FOREIGN PATENT DOCUMENTS

| | | |
|---|---|---|
| DE | 38 18 044 A1 | 11/1989 |
| EP | 0 416 391 A2 | 3/1991 |
| EP | 0784205 A1 | 7/1997 |
| EP | 1 195 880 A1 | 4/2002 |
| EP | 1 882 989 A2 | 1/2008 |
| FR | 2 974 897 A1 | 11/2012 |

OTHER PUBLICATIONS

Schott, "Zerodur Zero expansion glass ceramic", accessed at: http://www.schott.com/advanced_optics/english/download/schott_zerodur_katalog_july_2011_en.pdf, Jul. 2007, pp. 1-24.

* cited by examiner

ENCODER AND SENSOR SYSTEM HAVING PLURAL SENSORS AND ENCODER ELEMENTS FOR DETERMINING RELATIVE POSITIONS

FIELD OF THE INVENTION

The invention relates to a system for determining relative positions comprising an encoder and a sensor unit having at least two sensors spaced apart from one another, and to a method for highly precisely determining a sensor distance, and to a computer program product of such a type.

BACKGROUND

Systems comprising an electronic sensor unit for determining a relative position with the aid of encoder elements of an encoder are found in many fields. Such systems serve for example for determining a relative position between two members, of which generally one member is fixedly positioned and the other is movable relative thereto at least along one axis. Such a relative position may be e.g. the position of a machine component on a linear axis or rotation axis. Such systems are accordingly found in apparatuses such as coordinate measuring machines (CMM), geodetic apparatuses, robot arms, articulated arms, motors or hydraulic actuators. In this case, the sensor unit is fitted to one member, and the encoder is fitted to the other member. For determining a relative position, a sensor of the sensor unit detects at least one encoder element of the encoder. In order to be able to cover the entire possible range of relative movement, either the encoder extends over this range of movement, e.g. in the form of an elongated material measure as a fixedly positioned member, and the sensor unit is movable and designed for detecting a narrowly delimited region of the encoder. Alternatively, the sensor unit is fixedly positioned and extends over the region to be detected and the movable encoder, e.g. a magnetic target, has a narrowly delimited expansion. As a further alternative, the sensor unit is fixedly positioned and designed for detecting a narrowly delimited region and an elongated encoder moves relative to the sensor unit.

In some systems of this type, the sensor unit used has at least two individual sensors. In this case, the sensors are spaced apart from one another in a defined manner by means of being fixed to a substrate, e.g. that of a printed circuit board, wherein the value of the sensor distance is stored in a control and evaluation unit of the system. The sensors are configured such that they can each detect at least one encoder element. EP 1195880 A1 discloses such a system comprising an encoder and a sensor unit, which uses two sensors of a sensor unit that are spaced apart from one another in order to determine error values for the encoder elements of a movable encoder with the aid of the known sensor distance.

Environmental influences and/or aging phenomena can cause a change in the distance between the sensors in the case of sensor units of this type. One such environmental influence may be the action of heat, for example, which leads to an expansion of the substrate, the extent of which expansion is dependent on the coefficient of thermal expansion (for short: CTE) of the substrate material. By way of example, if a printed circuit board serves as a substrate, heat develops on account of the electric currents flowing there when the sensor unit is used, as a result of which the printed circuit board expands. In the case of conventional printed circuit boards comprising FR-4 laminate, the coefficient of thermal expansion is approximately $15 \cdot 10^{-6} K^{-1}$, such that a sensor distance of e.g. 20 mm changes by 3 µm in the case of a temperature change of 10K. Highly precise measured value determinations can be made more difficult or impossible by such changes in the sensor distance.

DE 3818044 A1 discloses a measuring device for incremental position determination between a sensor unit and an encoder. The encoder is designed as an elongated material measure with precision graduation. The sensor unit has a substrate, to which at least two photoelectric line sensors are fitted, wherein the sensors are spaced apart in the direction of the extent of the material measure. The material measure and the substrate consist of the same materials or at least of materials having the same coefficient of thermal expansion, wherein the materials are preferably transparent glass ceramics or quartzes having a negligible coefficient of thermal expansion. The material measure has a position code having alternating incremental and absolute sections, designed as sequences of light-transmissive and light-opaque increments. The distance between the sensors is adapted to the distance between the absolute sections in such a way that at least one absolute code section is detectable by at least one of the sensors in each positioning of sensor unit with respect to material measure. The position is determined from the detected increments. What is disadvantageous about the measuring device disclosed is that for highly precise measurements both sensor unit and encoder have to be embodied highly precisely and sensor distance and section distance between the absolute code sections have to be accurately coordinated with one another. What is disadvantageous, moreover, is that all code elements detected by all sensors have to be used for ascertaining a relative position. The questions concerning what absolute value is required for the coefficient of thermal expansion of the substrate material in order that it can be regarded as negligible, and how the sensors should be fixed to the substrate in order to determine the sensor distance, are neither addressed nor disclosed in DE 3818044 A1.

SUMMARY

Therefore, the problem addressed by some embodiments of the present invention is that of providing an improved system comprising a sensor unit having at least two sensors spaced apart from one another and comprising an encoder which allows highly precise measurements even without a highly precise encoder.

The present invention relates to a system for determining relative positions comprising an encoder and a sensor unit. The sensor unit and the encoder are movable relative to one another in a direction of extent and the encoder has encoder elements in the direction of extent. A determination of a relative position in the sense of the invention is the determination of a position of sensor unit and encoder relative to one another. The sensor unit has a first sensor and at least one further, second sensor for detecting encoder elements. The first and second sensors have a distance with respect to one another in the direction of extent (designated hereinafter as sensor distance), said distance being dimensioned such that with the sensor unit in one step, with unchanged relative positioning of sensor unit and encoder, at least one encoder element is detectable by the first sensor and at least one encoder element is detectable by the second sensor. In order to determine the sensor distance highly precisely, the system has a component composed of a dimensionally stable and aging-resistant material, the coefficient of thermal expansion of which, in terms of absolute value, is in a range of 0 to at most $5 \cdot 10^{-6} K^{-1}$, specifically in particular in the direction of extent.

In this case, in some embodiments, the sensor distance is determined before a relative position is determined. In other particularly preferred embodiments, it is also possible to determine the sensor distance simultaneously with the determination of a relative position.

Encoder elements are detected for example according to an optical, inductive, magnetic or capacitive principle of action. In preferred embodiments, the system is designed for the optoelectronic or capacitive-electronic determination of relative positions. In the case of an optoelectronic system, in some embodiments, the system has an imaging optical unit, which is optionally fixed to the component itself or integrated therein. Encoder elements are detected at the first and second sensors relative to a detection reference point defined as a sensor-internal position or sensor-internal coordinate for each of the two sensors. If the encoder has a continuous encoder element distribution, for example, exactly that encoder element which is situated at the detection reference point itself in relation to the direction of extent, in other words which has no offset with respect to the detection reference point in the direction of extent, is detected for the purpose of determining a relative position. In the case of an analog, continuous profile of the intensity of the physical action caused by the encoder elements (for example magnetic field intensity, light intensity, etc.), and a sensor having a punctiform detection field, which is therefore congruent with the detection reference point, for example simply this intensity is detected in the punctiform detection field. Alternatively, in particular in the case of a discontinuous distribution of the encoder elements or of the intensity distribution of their physical action, and a sensor having an extended detection field, an encoder element is detected in relation to a detection reference point by the determination of its distance or the distance with respect to the intensity peak (at least) in the direction of extent with respect to the detection reference point. In this case, the detection reference point, as described above, is situated within the detection field in a sensor-internally defined position. A distance determination is carried out, for example, by the signal strength of a signal generated by the detection being compared with a reference signal strength. In this case, the reference signal strength is the signal strength which would be detectable in the case of a detection without an offset. Such a reference signal strength can be stored in a control and evaluation unit of the system or can be ascertained with the aid of further samplings. Alternatively, a distance determination is carried out by means of position-sensitive detection, e.g. in the case of sensors having a linear or two-dimensional sensitive array. If a detection is carried out optoelectronically, a distance can be implemented e.g. by ascertaining the position of a brightness peak on a position-sensitive array, the detector zero point preferably representing the detection reference point. Alternatively or additionally, given the presence of code elements embodied as a pattern, a distance can be determined with the aid of the detected position of one or more patterns.

The distance between the detection reference points of the first sensor and of the second sensor defines a detection distance. If the distance between the sensors in the direction of extent is chosen to be much greater than the expansion of the sensors themselves, the detection distance is substantially given by the sensor distance, or in other words detection distance and sensor distance can be assumed to be identical under these circumstances.

In a first group of systems according to the invention, the component for highly precisely determining the sensor distance composed of a dimensionally stable and aging-resistant material is designed for the measurement-containing determination of the sensor distance by the system itself. "Measurement-containing" means that, for determining the sensor distance, a measurement is carried out by the system. For this purpose, the component has a scale that highly precisely defines a reference length.

In a second group of systems according to the invention, the sensor distance is measured highly precisely by the manufacturer before incorporation into the system and its value is stored in the control and evaluation unit of the system. In this second group, the component composed of a dimensionally stable and aging-resistant material determines the sensor distance highly precisely by virtue of the component serving as a substrate which positionally fixes the first and second sensors relative to one another. In other words, the sensors are fixed to the component in such a way that they are defined in terms of their position with respect to one another (at least in the direction of extent) temperature- and aging-independently, specifically on the basis of the properties of the material of the component. In some embodiments, the sensor distance is determined by the manufacturer before incorporation and is stored in the control and evaluation unit; in other embodiments, the sensor distance can be determined by the customer after incorporation and can be stored in the control and evaluation unit.

Embodiments in which the component both has a scale and serves as a substrate for positional fixing are equally possible according to the invention.

If the component has a scale, the scale defines a reference length with a relative error in the region of at most $5 \cdot 10^{-6}$, in particular in the region of at most $4 \cdot 10^{-6}$ or at most $1 \cdot 10^{-6}$, in embodiments for extremely precise applications in the region of at most $5 \cdot 10^{-7}$. The value of the reference length is preferably determined by the manufacturer before the incorporation of the component and is stored in a control and evaluation unit of the system. Alternatively, in some embodiments, the value of the reference length or the scale length can be determined e.g. interferometrically by the customer after incorporation and can be stored in the control and evaluation unit.

In some embodiments, the reference length is defined by the length of the scale in the direction of extent itself. In this case, the scale is embodied, i.e. dimensioned and arranged, in such a way that one scale end is detectable by the first sensor and the other scale end is detectable by the second sensor. The component and the sensor distance are therefore dimensioned in a manner coordinated with one another, such that the scale ends lie in the detection region of the sensors and the component has at least at the scale ends a physical property with the aid of which it is detectable by the sensors. By way of example, given the presence of a magnetic-electronic sensor unit, the scale ends have a magnetic region; given the presence of a capacitive-electronic sensor unit, the scale ends have a dielectric region; given the presence of an inductive-electronic sensor unit, the scale ends have a metallic region. The sensor distance is determined by one scale end being detected in relation to the detection reference point of the first sensor and the second scale end being detected in relation to the detection reference point of the second sensor, for which purpose the strength of the detected measurement signal is optionally also taken into account and evaluated. With the aid of the stored reference length, the current detection distance or sensor distance is ascertained from the knowledge of the positions of the scale ends in relation to the detection reference points.

In the case of an optoelectronic system, the scale ends can be projected for example by shadow casting or by reflection onto the two position-sensitive photosensors and the positions of the two bright-dark transitions on the sensors can be determined in relation to the detection reference points. Optionally, the system has an imaging optical unit for imaging the scale onto the photosensors, which imaging optical unit can be fixed to the component or integrated therein. The distance between the two bright-dark transitions corresponds (if appropriate corrected by previously measured correction values for the imaging behavior of the sensors, said correction values being stored in the control and evaluation unit) to the reference length, such that the current detection distance or sensor distance is calculated from the positions of the two bright-dark transitions on the sensors and the reference length.

Alternatively or additionally, in some embodiments, the scale has an absolute and/or incremental position code comprising code elements. In this case, a reference length is defined by the distance between the code elements. By means of the detection of at least one code element by a sensor, position values with respect to the code elements are determinable by the system with the aid of information stored in the control and evaluation unit. The sensor distance and the arrangement of the code elements on the scale are coordinated with one another for this purpose such that in each case at least one code element is detectable by the first sensor and by the second sensor. In some embodiments comprising line or area sensors, in each case more than one code element is detected by each sensor and, in order to increase the accuracy and/or reliability, the sensor distance is determined redundantly with the aid of a plurality of pairs of code elements of the first and second sensors. For determining the sensor distance, at least one first code element is detected in relation to the detection reference point of the first sensor and at least one second code element is detected in relation to the detection reference point of the second sensor. This is carried out either with constant relative positioning of sensor unit and scale or by virtue of firstly the first code element being detected by the first sensor and then the relative positioning being changed such that the first code element is detected by the second sensor and a second code element is detected by the first sensor, wherein optionally the intervening code elements are likewise detected during the change of the relative positioning.

The current detection distance or sensor distance is ascertained with the aid of the stored position code information concerning the at least two detected code elements and the stored reference length. The reference length is defined by the distance between two code elements. Given the presence of an incremental code, the distance between two directly adjacent code elements is defined as the reference length and the sensor distance is ascertained by summation of the distances of the code elements between the first and second code elements. For this purpose, the system either has further sensors, and/or the sensors are embodied as line or area sensors and/or the sensors are moved relative to the scale.

Given the presence of an absolute code, distances between such code elements which are jointly detectable as first and second code elements are stored, such that the distance associated with the detected first and second code elements is retrieved in order to ascertain the sensor distance. Alternatively, the sensor distance is ascertained by a procedure in which the distance between the first and second code elements detected in one step is calculated as a difference from the associated stored position values. If a code element has an offset with respect to the detection reference point, its distance with respect to the detection reference point is concomitantly taken into account in the process of ascertaining the sensor distance.

In a first embodiment, the component composed of the dimensionally stable and aging-resistant material is arranged at the encoder, wherein the component together with the encoder in some embodiments forms a unit in such a way that the unit as a whole is movable relative to the sensor unit. In other embodiments, the unit is stationary and the sensor unit is moved relative to the encoder. In some embodiments, the component forms a kind of extension of the encoder by being adjacent to one end of the encoder, wherein the component in these embodiments has a scale having code elements. In other embodiments of the same type, the system has a respective component at each end of the encoder, each of which per se enables the sensor distance to be determined. In these embodiments, for determining the sensor distance, the sensor unit is displaced along the direction of extent relative to the encoder by an amount such that the end of the encoder is overshot and the first and second sensors can detect the scale.

If the sensors are wider than the encoder with their detection fields in an orthogonal direction with respect to the direction of extent, for example if they are configured as area sensors, then it is advantageous with regard to shorter displacement travels for a plurality of components to be arranged directly beside the encoder along the direction of extent, each of which per se enable the sensor distance to be determined, such that the sensor distance can be determined at a plurality of locations along the direction of extent.

As an alternative to the arrangement on the encoder, in a further embodiment, the component is arranged on the sensor unit, such that the component is movable relative to the encoder. In a first variant of this type of embodiment, the component once again has a scale having code elements. In order to enable the scale to be detected, said scale is arranged in the detection field of the sensors, for which purpose the component advantageously has the scale on a sensor-facing side.

In order to enable the detection of code elements for determining the sensor distance, the component, in the case of arrangement on the sensor unit, at least partly covers the detection field of the first and second sensors. In order to enable detection of encoder elements which lie behind the component, as viewed from the sensors, despite this coverage, the component in some embodiments is embodied in such a way that it is at least substantially transmissive for the physical property with the aid of which the encoder elements are detected by the sensors. This can be achieved by a corresponding choice of component material parameters such as composition, thickness or structuring. For better differentiation of the detection of encoder elements and code elements, it is possible to use physical properties that can be differentiated for the respective detection thereof. By way of example, the strength of the detected measurement signals from encoder elements can be clearly distinguished from that of the code elements.

If encoder elements are detected optically, then the thickness or the type of material of the component or of the scale is chosen such that it is transparent to the light with which the encoder is illuminated or transilluminated. In some embodiments, encoder elements and code elements are illuminated with light having in each case a different wavelength, polarization state or light that can be differentiated on the basis of frequency modulation.

If the sensors are embodied as area sensors, such that they are extended not only in the direction of extent but also in a direction orthogonally with respect thereto, alternatively the material of the component is chosen without taking account of a transmissivity and instead the component is shaped narrowly in this orthogonal direction in such a way that it only partly covers the encoder-facing side of the sensors in this direction. In other words, in such embodiments, encoder elements are detected past the component or scale. The encoder is accordingly designed to be wider than the component in said orthogonal direction or is arranged in an offset manner relative to the component in said orthogonal direction.

A correspondingly transmissive or narrowly shaped component also affords advantages in the case of the component being arranged at the encoder. By way of example, such a component is fixedly mountable on the encoder (and thus between the encoder and the sensor unit). In this way, the component is arbitrarily positionable along the direction of extent, which is advantageous with regard to shorter displacement travels. In some embodiments, the system has a plurality of such components at different locations along the direction of extent, each of which per se enable the sensor distance to be determined, such that the sensor distance can be determined at a plurality of locations along the direction of extent. Furthermore, it is thus possible to realize a component which can be fitted to the encoder by the user or in an automated manner flexibly and, if appropriate, only as necessary. If it can be assumed that no environmental influences that change the sensor distance occur during a measurement or if changes in the sensor distance are irrelevant during a specific measurement task, the component, before the measurement, is fitted to or on the encoder for the purpose of determining the sensor distance, and is then removed again and the measurement is carried out without the component. In such a case, the requirements in respect of transmissivity or narrow shaping of the component are reduced or unnecessary.

In a system comprising a component having a scale that defines a reference length, the sensor distance is therefore determined by at least one part of the scale being detected by means of the sensor unit. As a result, the sensor distance can be determined highly precisely by the system itself at any time, in particular at the same time as a position determination with the aid of the encoder, such that a highly precise knowledge of the actual sensor distance is achieved despite environmental influences such as the action of heat or aging phenomena.

Alternatively or additionally, the component composed of a dimensionally stable and aging-resistant material, the coefficient of thermal expansion of which, in terms of absolute value, is in a range of 0 to at most $5 \cdot 10^{-6} K^{-1}$, serves as a substrate which fixes the first and second sensors in terms of their positions with respect to one another. In this case, the sensor distance is determined by a measurement by the manufacturer with a relative error in the region of at most $5 \cdot 10^{-6}$, in particular in the region of at most $4 \cdot 10^{-6}$ or at most $1 \cdot 10^{-6}$, in embodiments for extremely precise applications in the region of at most $5 \cdot 10^{-7}$.

In a first embodiment, the first sensor and the second sensor are positionally fixed with the aid of the component by virtue of the fact that they bear laterally on the component and are kept in this position bearing on the component in each case by a force being applied to them in the direction of the component. These forces press the sensors onto the component, as a result of which their distance with respect to one another is constant. Said force is brought about by a spring or clamping device having the sensor unit. Such a spring or clamping device can press the sensors onto the component from the housing or a mount or can be fixed to the component itself by one end in order to hold the sensors by compressive forces on the component. In order to increase the positional stability in this position, the component in some embodiments has bearing edges which expand in the direction of extent and on which the sensors bear by an end region. The component is fixed directly to the housing of the sensor unit or to some other element of the sensor unit, for example a printed circuit board or a mount element.

In an alternative embodiment, the first and second sensors for positional fixing are fixedly connected to the component, which is shaped as a kind of bridge which connects the two sensors to one another and which has two pillars, to the lower ends of which the sensors are fixed. The fixing locations are preferably situated at the sides facing away from the encoder. Particularly if the sensors and the component have considerably different coefficients of thermal expansion, the connection location between sensor and component, taking account of a sufficient strength, is advantageously as small as possible in order to avoid mechanical stresses in the event of heat flow on account of different expansion. If the sensors in this case are connected to a printed circuit board and are carried by the latter, either the component for the most part is embedded in the printed circuit board or only the pillars of said component are led through the printed circuit board, for which purpose the printed circuit board can be interrupted at this location in the direction of extent. In some embodiments, the component adopts a sensor-carrying function in addition to its position-fixing function.

If the detection reference points of the first and second sensors are not situated in the region of the respective fixing locations to the thermally stable substrate and if the coefficient of thermal expansion of the sensor material or the thermal expansion of the sensors under the action of heat is not negligibly small, then the positions of the detection reference points relative to the fixing location can be displaced on account of the thermal expansion of the sensors themselves. In order that the detection distance remains constant even in such a case, the detection reference points are arranged in a manner offset relative to the respective fixing location by the same amount in the same direction along the direction of extent. As a result (under the assumption of sensors having an identical thermal expansion behavior) the positions of the detection reference points relative to one another and thus the detection distance remain the same even upon the action of heat on the sensors.

In a further embodiment, the first and the second sensors are fixed to the component by their encoder-facing sides, specifically preferably by means of bonding. Since the component in such a case completely or partly covers the detection fields of the sensors, component and bonding are constituted such that they allow the detection of encoder elements, analogously to the constitution of the component having a scale as described further above.

In some embodiments, alternatively, the sensors are in each case divided into two zones. The first zone is the actual sensor in the sense that said zone is designed for detecting encoder/code elements. The second zone serves for fixing the sensor to the substrate. Such division into zones serves in some embodiments for detecting encoder elements past the component as a result of the arrangement of the zones transversely with respect to the direction of extent. Moreover, damage to the sensitive first zone as a result of the fixing process can thereby be avoided, which is advantageous particularly in the case of sensors without a housing.

As a result of different coefficients of thermal expansion of sensors and the unit to which they are fitted (component and/or printed circuit board), mechanical stresses can occur under the action of heat. If a relative displacement of sensor and unit to which they are fitted can be afforded tolerance, the connection locations in some embodiments are embodied flexibly such that sensor and component or printed circuit board can move relative to one another within the scope of the thermally governed linear expansion to be expected. If the sensors are positionally fixed by the component in such a way that relative displacements are disadvantageous, alternatively the connection locations are embodied as rigid and the sensors are embodied in such a way that they can take up the mechanical stresses that occur without impairment of their functioning, primarily also with regard to the position of the detection reference point and the measurement accuracy. For this purpose, material and shape of the sensors are chosen for example in such a way that the sensors even under stress do not deform or only deform in a defined manner in such a way that their performance or the measurement accuracy is not reduced. In some embodiments, alternatively the component and the sensors are composed of identical materials or of materials having an identical coefficient of thermal expansion having absolute values in the range of 0 to at most $5 \cdot 10^{-6} K^{-1}$. Since the system according to the invention advantageously has sensors free of a housing, which are produced from silicon in accordance with the present-day prior art, in these alternative embodiments the component is preferably likewise produced from silicon or from a material having a coefficient of thermal expansion which is equal or very similar to that of silicon.

The manner of the embodiment of connection locations between sensors and the unit to which they are fitted (component and/or printed circuit board) is advantageously implemented with adaptation to the issues described in the previous paragraph. Flexible connection locations are preferably embodied as soft soldering locations and rigid connection locations between units having a different thermal expansion behavior are preferably produced by means of bonding, for example by means of anodic bonding or wafer bonding. Connection locations between units having an identical thermal expansion behavior can be produced both by soldering and by bonding, but also for example by adhesive bonding or other processes known to the person skilled in the art.

In some embodiments, the component has electrical conductor tracks via which electrical contact is made with the sensors at least in part. As a result, the component adopts the function of a printed circuit board in addition to its function of determining the sensor distance, as a result of which a conventional printed circuit board can be partly or completely replaced.

For very high demands placed on the precision of the measurement results, the system has a thermometer which can be used to determine the temperature of the component and/or at the sensors. This is because even if the coefficient of thermal expansion of the component is at most $5 \cdot 10^{-6} K^{-1}$, such a small change in length of the component and thus in the sensor distance can nevertheless be problematic for specific measurements. For such cases, the current temperature of the component is respectively detected by means of the thermometer. In addition, there are stored in the control and evaluation unit items of information with regard to the coefficient of thermal expansion of the component material or sensor material, for example the value of the linear expansion of the component or of the sensors in the direction of extent depending on the temperature in relation to a reference temperature or the value of the coefficient of thermal expansion. If the material (with regard to the required precision) has a coefficient of thermal expansion having non-negligible temperature dependence, optionally the coefficient of thermal expansion in terms of its dependence on the temperature or linear expansion values of the component material for various temperatures is or are stored in the control and evaluation unit. By means of the thermometer, for the purpose of determining the sensor distance, the temperature of the component or of the sensors is measured and taken into account when determining the sensor distance. For this purpose, a value of the thermally governed expansion of the component and/or of the sensors in the direction of extent is calculated with the aid of the temperature and the stored information. If the component has a scale, the reference length is corrected with the aid of this computational value, and if the component serves as a substrate for positional fixing, the stored sensor distance is corrected with the aid of this computational value. In these embodiments, therefore, temperature changes can additionally be compensated for computationally. Alternatively or additionally, the system has means with which the temperature of the sensor unit, of the component or of the sensors can be influenced in a targeted manner. By means of such cooling or heating, the temperature of the sensor unit, of the component or of the sensors is advantageously kept constant, as a result of which temperature-governed changes in the sensor distance are avoided.

In some embodiments, for the absolute value of the coefficient of thermal expansion of the component material, the range according to the invention of 0 to at most $5 \cdot 10^{-6} K^{-1}$ holds true in a temperature range of 253K to 343K, which encompasses low- and high-temperature applications. In particular, the specified absolute value range in particular embodiments holds true in a temperature range of 288K to 303K, which is within the scope of customary operating temperatures. This especially holds true, preferably for applications in air-conditioned areas, in a temperature range of 291K to 295K.

In some embodiments, the coefficient of thermal expansion of the dimensionally stable and aging-resistant material from which the component is produced is, in terms of absolute value, within a range of 0 to $4 \cdot 10^{-6} K^{-1}$, in particular embodiments for higher precision requirements, in terms of absolute value, within a range of 0 to $1 \cdot 10^{-6} K^{-1}$, in specific embodiments with very high requirements made of the precision, in terms of absolute value, within a range of 0 to $3 \cdot 10^{-7} K^{-1}$, as a result of which the sensor distance is determined or determinable even more precisely. In some embodiments, the sensors and the component are coordinated with one another in such a way that the coefficient of thermal expansion of the component material is equal to or at most of the same magnitude as the coefficient of thermal expansion of the sensors.

The choice of the component material with regard to its coefficient of thermal expansion can be made dependent on whether or not the system is designed for computational temperature compensation. If no computational temperature compensation is carried out, the small ranges specified in the previous paragraph, in particular the range of 0 to $3 \cdot 10^{-7} K^{-1}$, for the absolute value of the coefficient of thermal expansion of the component material are advantageous with regard to the precision of the sensor distance determination. If, instead, according to the invention, the component temperature is taken into account computationally, this is utilized in order to achieve a higher precision in the case of a relatively small coefficient of thermal expansion or alternatively, with the precision remaining the same, to allow a relatively large value of the coefficient of thermal expansion in terms of the absolute value up to the specified value of $5 \cdot 10^{-6} K^{-1}$ and thus to make lower requirements of the component material, whereby cost advantages can be achieved in the production of the component and thus of the system.

In some embodiments, the system for determining a relative position is designed as a linear encoder system. In this case, the encoder is designed as a material measure having encoder elements which form an incremental or absolute position code. In specific embodiments, such a system is part of a 3D coordinate measuring machine (CMM) for determining relative positions along a measurement axis.

In most embodiments, the distance between the first and second sensors is in the range of 1 mm to 100 mm. Particularly given the presence of an optoelectronic or capacitive-electronic sensor unit, the sensor distance is optionally in the range of 5 mm to 50 mm, and embodiments for specific applications such as use in a CMM have a sensor distance in the range of 10 mm to 30 mm, for example. A sensor distance of 20 mm has also proved to be particularly advantageous here.

The sensor distance can be defined independently of the distance between individual encoder elements or groups of encoder elements. The present invention therefore affords the advantage that sensor distance and encoder element distances have to be chosen in a manner coordinated with one another merely to the effect that in one step at least one encoder element is detectable by the first sensor and at least one encoder element is detectable by the second sensor. It is not necessary, for example, for the sensor distance to be adapted to the arrangement of encoder elements forming a position code in such a way that in one step specific position code sections are detectable by the first and second sensors. Likewise, the system according to the invention can be realized independently of whether an absolute or incremental position code is used. Moreover, the material from which the encoder is produced can be chosen independently of the component material. It is not necessary for encoder and component to be composed of the same material, nor for them to have the same coefficient of thermal expansion. Therefore, the system according to the invention affords the advantage of—from multiple standpoints—greater freedom of design for encoder and/or sensor unit. In addition, since the requirements made of the encoder in respect of the properties of the material are not the same as the stringent requirements made of the component in respect of the properties of the material, at least systems according to the invention comprising a long encoder, which thus involves a high outlay on material, give rise to lower system production costs than in the case of precision systems for determining a relative position according to the prior art.

Furthermore, in the case of the present invention it is advantageous that, as a result of the dimensionally stable and aging-resistant component, the distance between the first sensor and the at least second sensor is determined or determinable highly precisely at any time, that is to say including during the actual measurement, i.e. during the relative position determination between sensor unit and encoder. The sensor distance remains constant over time on account of the arrangement of component and sensors and/or its current value can be measured highly precisely by means of the component, without external measuring devices being necessary for this purpose.

In addition, the system according to the invention can advantageously be realized independently of the manner of detection of encoder elements. The detection can be based on optical, capacitive, inductive, magnetic or other physical principles. Furthermore, the system in some embodiments is advantageously designed in such a way that for measurements for position determination in which the sensor distance is of no importance and the use of a plurality of sensors is therefore not necessary, optionally only one or a specific combination of the sensors present can be used.

The present invention additionally relates to a method for highly precisely determining a sensor distance of a system according to the invention comprising a first sensor, at least one second sensor and a component composed of a dimensionally stable and aging-resistant material. By means of the component, the the sensor distance is determinable either by virtue of the fact that the sensors are positionally fixed in a measured and stored position with respect to one another by the component, or by virtue of the fact that the component has a scale that defines a reference length and the sensors detect at least parts of the scale and their distance with respect to one another is determinable with the aid of the reference length of the scale. In this case, the material of the component has a coefficient of thermal expansion whose value, in terms of the absolute value, is in a range of 0 to $5 \cdot 10^{-6} K^{-1}$, in particular of 0 to $1 \cdot 10^{-6} K^{-1}$, especially of 0 to $6 \cdot 10^{-7} K^{-1}$. In this case, the reference length is determined or measured with an accuracy of just the same magnitude.

If the component has a scale, in some embodiments the reference length is equal to the length of the scale. The reference length is stored in a control and evaluation unit of the system. In this case, the sensor distance is determined with the aid of the stored reference length by virtue of one scale end being detected by the first sensor and the second scale end being detected by the second sensor. Alternatively, the scale has a position code composed of code elements and the reference length is defined by the distance between code elements. In this case, the distance between said code elements is stored as the reference length or is calculated with the aid of the position values stored for the code elements. The sensor distance is determined with the aid of the stored reference length by virtue of at least one code element being detected by the first sensor and at least one code element being detected by the second sensor. Given the presence of an incremental code, if appropriate, intervening code elements are likewise detected, for which purpose the system has further sensors, and/or the sensors are designed as line or area sensors and/or the sensors are moved relative to the scale.

In the context of the method for highly precisely determining a sensor distance, the temperature of the component composed of a dimensionally stable and aging-resistant material is optionally determined. By means of information about the thermal expansion behavior of the component that is stored in the control and evaluation unit, the measured temperature is taken into account in the determination of the sensor distance. By way of example, the value of the coefficient of thermal expansion of the component material or the linear expansion of the component in each case depending on the temperature is stored in the control and evaluation unit. Given the presence of a component having a scale, the reference length defined by the length of the scale or the distance between position code elements or, given the presence of an absolute code, the positions assigned to the code elements is or are corrected depending on the measured temperature. If the component serves as a substrate for positionally fixing the sensors relative to one another, the sensor distance being measured at a defined temperature and, if necessary together with the defined temperature, being stored in the control and evaluation unit, the stored sensor distance is corrected with the aid of the measured temperature.

The present invention furthermore includes a computer program product or computer data signal, embodied by an electromagnetic wave, comprising program code, for controlling or carrying out the method for highly precisely determining a sensor distance. The method can be supervised and performed by the system itself or with the aid of suitable data transfer devices wholly or partly externally, e.g. by a connected computer unit.

The system according to the invention and the method according to the invention for highly precisely determining a sensor distance are described in greater detail purely by way of example below on the basis of embodiments illustrated schematically in the drawings. Identical elements are identified by identical reference signs in the figures. The embodiments described are generally not illustrated in a manner true to scale, nor should they be understood as a restriction.

BRIEF DESCRIPTION OF THE DRAWINGS

In the figures, specifically:

FIGS. 3a,b show a second embodiment of a system according to the invention comprising a component composed of a dimensionally stable and aging-resistant material and having a scale, in FIG. 3a in a side view analogous to FIG. 2, and in FIG. 3b along the sectional line B-B from FIG. 3a;

DETAILED DESCRIPTION

Figure 1:
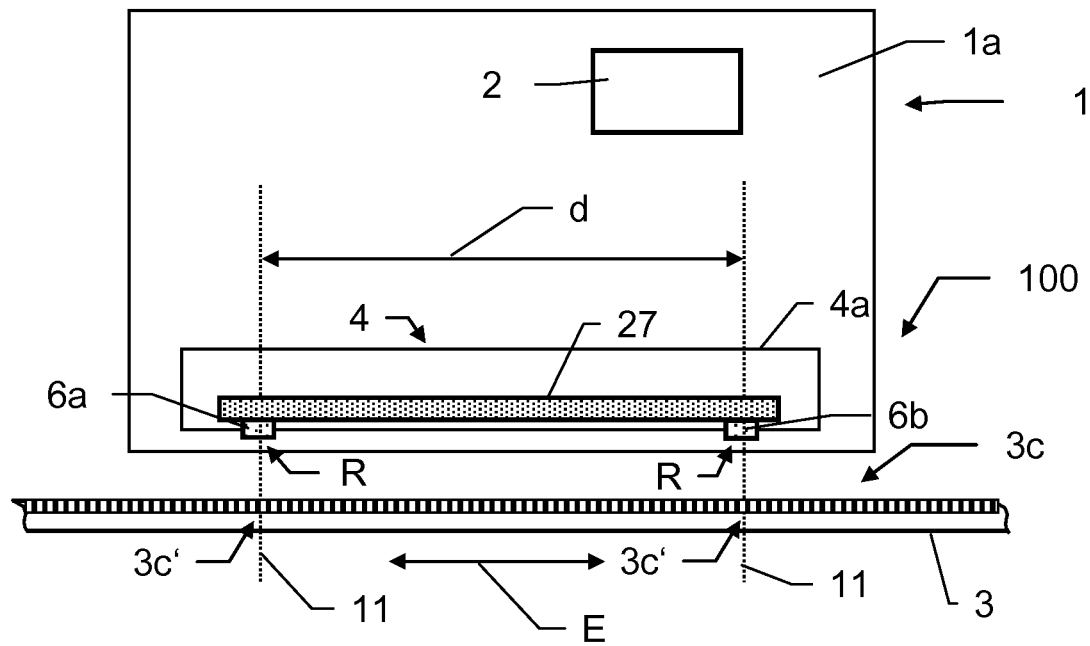
FIG. 1 shows a schematic overview illustration in side view of a measuring device for determining relative positions according to the prior art.

FIG. 1 shows a schematic overview illustration in side view of a system 100 for determining a relative position according to the prior art as part of a measuring device. The system 100 has an elongated encoder 3 having encoder elements 3c, for example a material measure having along its direction of extent (arrow E) an optical code track having alternating bright and dark increments as encoder elements 3c. The system 100 furthermore has a sensor unit 4 having a first sensor 6a and a second sensor 6b for detecting encoder elements 3c, in the case of optoelectronic sensors 6a,b for example by means of shadow casting or optical imaging of the encoder elements 3c. The sensor unit 4 is part of a read head 1, which furthermore has a control and evaluation unit 2. Such a measuring device can be part of a 3D coordinate measuring apparatus, for which purpose the encoder elements 3c encode position values. The sensors 6a, 6b are fixed to a substrate 27 in a manner spaced apart at a distance d with respect to one another. The substrate 27 is for example a mount or e.g. a printed circuit board (PCB), on which the sensors 6a, 6b are fitted and electrically connected. The substrate 27 can additionally serve for connection between the housing 4a of the sensor unit 4 and the further components (sensors 6a, 6b, etc.). Each sensor 6a and 6b, respectively, is designed for detecting at least one encoder element 3c, as a result of which at least two encoder elements are detectable in one step. The electrical output signals of the sensors 6a,b which are generated depending on detected encoder elements 3c are evaluated by means of the control and evaluation unit 2. Encoder 3 and read head 1 are movable relative to one another in the direction of extent (arrow E) of the encoder 3. As one possible alternative to the illustrated embodiment with an elongated encoder 3, systems 100 are known in the art which have an elongated sensor unit 4 having a likewise long sensor array comprising individual sensors 6 which detect an encoder 3 of small expansion which is movable relative thereto. One sufficiently known example thereof is capacitive detection by means of extended electrode structures (as part of a sensor unit 4) of a shaped dielectric (as encoder 3).

A detection reference point R is defined in each case for the two sensors 6a, 6b. The sensor-internal position of the respective detection reference point R is known and stored in the control and evaluation unit 2. Such a detection reference point R is distinguished by the fact that by detecting an encoder element 3c of the encoder 3 in relation to said detection reference point R by means of the respective sensor 6a,b, it is possible to ascertain an unambiguous relative position between said sensor 6a,b and encoder element 3c and thus between read head 1 and encoder at least in relation to the direction of extent (arrow E). For this purpose, either that code element 3c' is detected which is situated in relation to the direction of extent (arrow E) without an offset with respect to the detection reference point R (that is to say lies on the dashed line 11) or in the case of a different code element the distance thereof with respect to the detection reference point R in the direction of extent (arrow E) is determined (that is to say the distance of the code element with respect to the dashed line 11). In the case of optoelectronic sensors 6a,b having a PSD element (position sensitive device), the detection reference point R is advantageously the defined zero point of the light-sensitive sensor area. The position of the zero point or detection reference point R on the sensor area is known and stored in the control and evaluation unit 2. A distance is advantageously determined as distance between the pixel illuminated by the detection and the zero point. The distance between the detection reference points R of the first sensor 6a and of the second sensor 6b defines a detection distance. The distance between the detection reference points and thus the detection distance is substantially given by the distance d between the sensors 6a, 6b. In the case of a sensor unit 4 according to the prior art, the sensor distance d can inadvertently change. The substrate 27 can deform as a result of changing environmental influences and/or aging phenomena. By way of example, the evolution of heat on account of the electric currents in a printed circuit board can lead to a non-negligible expansion of the printed circuit board. As a result of the change in shape, there is also a change in the distance d between the sensors 6a, 6b fixed to the printed circuit board, and thus in the detection distance, which has a disadvantageous effect in measurement situations.

FIGS. 2 to 9 illustrate embodiments of a system 100 according to the invention for determining a relative position, which in each case have a component 5 for highly precisely determining the sensor distance d composed of a dimensionally stable and aging-resistant material having a coefficient of thermal expansion having an absolute value in a range of 0 to at most $5 \cdot 10^{-6} K^{-1}$. So-called ultra-low thermal expansion materials (ULE) having coefficients of thermal expansion in a range of $0 \pm 2.5 \cdot 10^{-7} K^{-1}$ to $0 \pm 5 \cdot 10^{-6} K^{-1}$ which are suitable for this purpose are e.g. Zerodur®, Nexcera (Naught EXpansion CERAmic) or Ultrahigh-purity INVAR 36. The highly precise determination of the sensor distance d is achieved by means of the component 5 by virtue of the fact that it has a scale which defines a reference length, and/or by virtue of the fact that the component 5 serves as a substrate and the first and second sensors 6a, 6b or arbitrarily further sensors 6c are fixed in their positions with respect to one another by the component 5, which is expressed hereinafter by the term "positionally fixed". Since the component 5 experiences no deformation whatsoever, primarily in the direction of extent (arrow E), as a result of temperature influences and/or aging, the positions of the sensors 6a-c with respect to one another are thus also defined in an invariable fashion. In some embodiments, the component 5 additionally serves for mechanically connecting the sensors 6a, 6b and/or 6c to the housing 4a of the sensor unit 4. In this case, in some embodiments, the determination of the sensor distance d with the aid of the component 5 is carried out simultaneously with the determination of a relative position with the aid of the encoder 3. The encoder 3 preferably has optically detectable encoder elements 3c or is designed for the detection of the encoder elements 3c according to the capacitive, magnetic, inductive or some other physical principle of action.

The embodiments according to the invention have at least one dimensionally stable and aging-resistant component 5, 5a-c having the properties described above and a printed circuit board for electrically connecting the sensors 6a-c. The printed circuit board in examples 1-7 is a PCB 20. In the embodiment according to FIG. 8, the functions of the printed circuit board are fulfilled by the components 5a-c composed of a dimensionally stable and aging-resistant material, which have for this purpose electrical conductor tracks and also electrical and mechanical connections to the sensors 6a,b,c. The sensors 6a-c are held or carried by the PCB 20 in the embodiments according to FIGS. 1-4 and FIG. 7, by the PCB 20 and the component 5 in the embodiments according to FIG. 5 and FIGS. 6a-c, and solely by the component 5 in the embodiment according to FIG. 8. The connection between sensor 6a-c and PCB 20 is preferably effected via ball grid arrays (BGA) 7.

Figure 2:
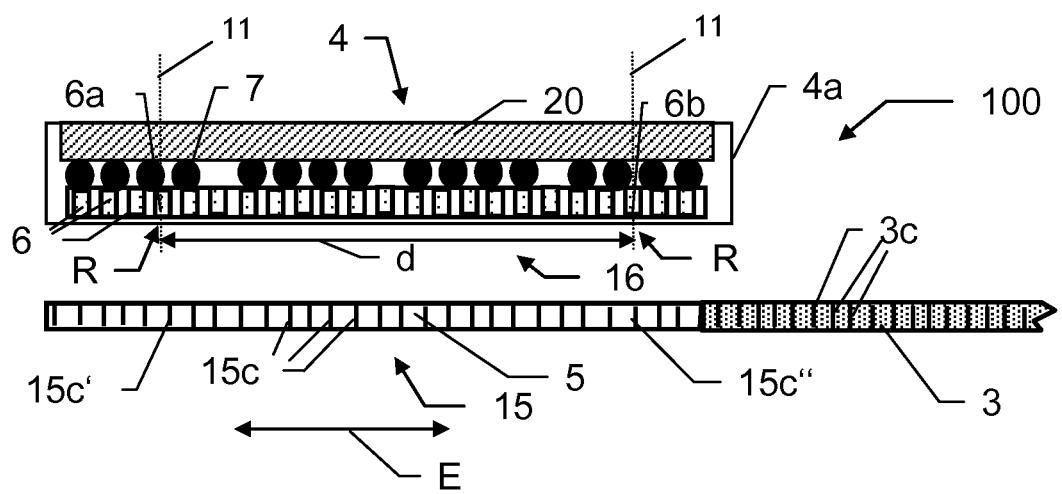
FIG. 2 shows a schematic illustration in side view of one embodiment of a system according to the invention comprising a component composed of a dimensionally stable and aging-resistant material and having a scale.
Figure 3A:
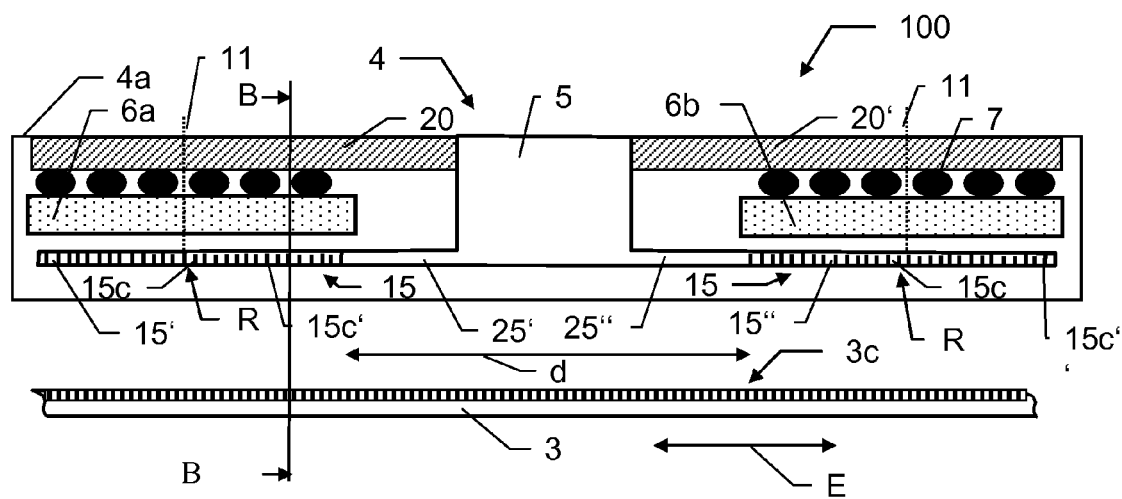
Figure 3B:
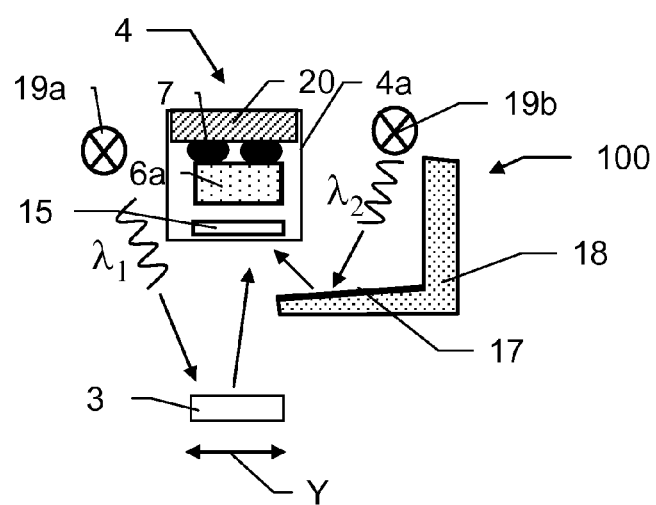
Figure 4:
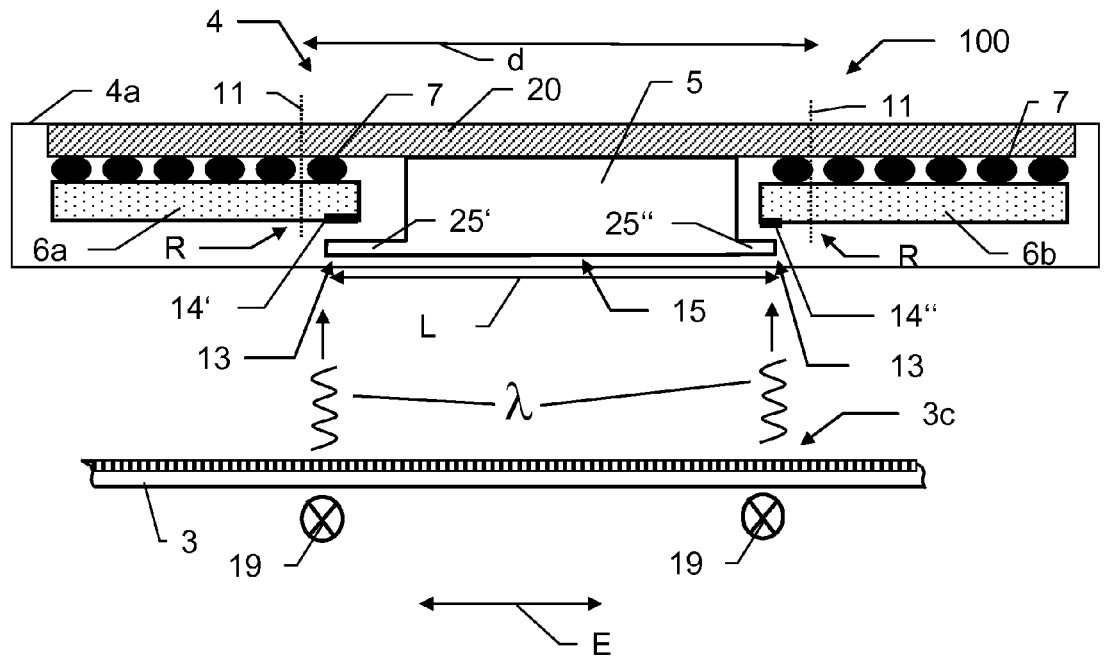
FIG. 4 shows a schematic illustration in side view of a further embodiment of a system according to the invention comprising a component composed of a dimensionally stable and aging-resistant material and having a scale.

FIGS. 2 to 4 show embodiments of a system 100 according to the invention which have a component 5 having the properties specified above and having a scale 15 for the purpose of determining the sensor distance d. The scale 15 defines a reference length for determining the sensor distance d. For this purpose, the scale is measured highly precisely before the incorporation of the component 5, such that the reference length has a relative error of at most $5 \cdot 10^{-6}$, in particular embodiments for even more precise measurement purposes of at most $1 \cdot 10^6$, for extremely precise applications of at most $5 \cdot 10^{-7}$.

The embodiment according to FIG. 2 has, adjacent to one end of the encoder 3, according to the invention, the component 5 having the scale 15. The scale 15 has a position code composed of code elements 15c, which are detectable by the sensor unit 4 according to the same physical principle of action as the encoder elements 3c. Given the presence of an optoelectronic sensor unit 4, therefore, by way of example, the code elements 15c are detected by means of shadow casting or optical imaging, optionally with ascertainment of a size ratio of the imaging of the code elements 15c or of the encoder elements 3c and/or a change that has possibly occurred in the imaging size ratio by virtue of variation of the distance perpendicular to the direction of extent (arrow E) of the sensors with respect to the encoder 3 or component 5. The sensor unit 4 has a linear array 16 having a multiplicity of individual sensors 6, for example a CMOS array or a CCD array having in each case 1024×1 pixels. The position of each sensor 6 within the array 16 is known and stored in the control and evaluation unit 2. Two of the sensors 6 of the array 16 serve as reference point sensors 6a, 6b, wherein a respective detection reference point R and thus the detection and sensor distance d are defined by the position of the first sensor 6a and by the position of the second sensor 6b. Which sensors of the array 16 are used as first and respectively second sensor 6a, 6b is defined by the manufacturer and/or by the user by configuration by means of the control and evaluation unit 2. The component 5 composed of a dimensionally stable and aging-resistant material corresponds to an extension of the encoder 3 on account of its arrangement at the end of the encoder. The length of the component 5 corresponds at least to the sensor distance d in the direction of extent, wherein a somewhat greater length that takes account of an expected increase in the sensor distance d on account of the action of heat is advantageous. A length of the component 5 and thus of the scale 15 that is significantly greater in comparison with the sensor distance d is used for increasing the accuracy of the determination of the sensor distance d in alternative embodiments. Instead of being arranged at one end of the encoder 3, the component 5 can be arranged between two segments of the encoder 3. For cost reasons, the encoder 3 is produced from a less dimensionally stable and aging-resistant material than the component 5. Moreover, the arrangement of the encoder elements 3c can deviate from that of the code elements 15c, e.g. with regard to arrangement density, alignment or pattern formed by the code elements 15c. The position values of the code elements 15c are determined precisely and stored in the control and evaluation unit 2, as a result of which the distance between two code elements 15*c* can be ascertained. The sensor distance d is determined with the aid of the scale 15, for which purpose the sensor unit 4 is positioned opposite the component 5, for example by movement of the read head 1. Afterward, at least one code element 15*c* is detected by the first sensor 6*a* and a further code element 15*c* is detected by the second sensor 6*b* and the distance between the two code elements 15*c*' and 15*c*" is used as a reference length. Given the presence of an absolute code, for this purpose the difference is formed between the two positions which are assigned to the two code elements 15*c*' and 15*c*" with the aid of those stored in the control and evaluation unit 2. Given the presence of an incremental code composed of equally spaced code elements 15*c*, alongside the two code elements 15*c*' and 15*c*" all code elements 15*c* therebetween are detected and the sum of the corresponding number of code element distances is formed, wherein the distance between the code elements 15*c* is stored as the reference length in the control and evaluation unit 2. Since, in the present embodiment, the component 5 is arranged at the encoder and is thus easily accessible, a measurement of the scale 15 for defining the reference length can also be carried out by the customer after the mounting of the system 100, instead of before the incorporation of the component 5.

In the embodiment of the system 100 according to the invention according to FIGS. 3*a* and 3*b*, the system 100 has a component 5, which is once again produced from the dimensionally stable and aging-resistant material and has a scale 15 having a position code composed of code elements 15*c*. In contrast to the previous embodiment, the component is arranged on the sensor unit 4. The component 5 is fixed to the housing 4*a* of the sensor unit like the PCBs 20 and 20' and is embodied as a shaped piece having a parallelepipedal main body having a first cantilever 25' having a first part 15' of the scale 15 and a second cantilever 25" having a second part 15" of the scale 15. The first part 15' of the scale 15 lies completely in the detection region of the linear sensor 6*a* and the second part 15" of the scale 15 lies completely in the detection region of the linear sensor 6*b*. As an alternative to the embodiment illustrated, the component can have only one cantilever with position code, which extends in the direction of extent (arrow E) from the beginning of the first sensor to the end of the second sensor, such that a part of the scale 15 lies in the detection region of the sensor 6*a* and a part of the scale 15 lies in the detection region of the sensor 6*b*. The sensors 6*a,b* are fixed to the PCBs 20, and the parts 15', 15" of the scale 15 are arranged between encoder 3 and sensors 6*a,b*. The sensor distance d is determined analogously to the procedure according to FIG. 2: in each case at least one code element 15*c*' is detected by the first sensor 6*a* and at least one code element 15*c*" is detected by the second sensor 6*b*, in each case in relation to the detection reference point R. In the present case, for producing the relation to the detection reference point R, in each case the distance in the direction of extent (arrow E) of the code element 15*c*' and 15*c*" with respect to the respective detection reference point R is determined, since the two arbitrarily chosen code elements 15*c*' and 15*c*", in the direction of extent (arrow E), are not situated on a line 11 with respect to the respective detection reference point R, but rather in a manner offset with respect thereto. The detection reference points R in the example are situated in the center of the sensors 6*a,b*, but their positions can generally be chosen arbitrarily. The distance between the two detected code elements 15*c*' and 15*c*", which is ascertained with the aid of the information stored in the control and evaluation unit 2, serves as a reference length for determining the sensor distance d, wherein in the present case the distance between the code elements 15*c*' and 15*c*" and the detection reference points R is taken into account when determining the detection distance. In order to enable the sensor distance d to be determined in all situation given the presence of an incremental code, in the case of the illustrated division of the scale 15 into two parts 15' and 15", care should be taken to ensure that two distinguished code elements 15*c* at a known distance from one another are respectively detectable by a sensor 6*a* and 6*b*. Such distinguished code elements 15*c* are, for example, the respective outermost code elements or code elements differentiated by line thickness deviating from the rest of the code elements 15*c*.

In the present embodiment the encoder 3 having the encoder elements 3*c* is arranged behind the scale 15, as viewed from the sensors 6*a,b*. In order nevertheless to enable encoder elements 3*c* to be detected by the sensors 6*a,b*, the component 5 or the region of the scale 15 is such that it allows detection of the encoder elements 3*c*. By way of example, in the case of capacitive sensors 6*a, b*, the component 5 is composed of a material which is permeable to the electric fields of the encoder elements 3*c* and in the case of optical sensors 6*a,b* is correspondingly transmissive to the light with which the encoder elements 3*c* are illuminated.

In order to differentiate whether a detected measurement signal is to be assigned to a code element 15*c* or to an encoder element 3*c*, detection is carried out with the aid of differentiable features. This can be achieved e.g. by means of a different arrangement of code elements 3*c* and encoder elements 15*c*, e.g. with regard to arrangement density, alignment or pattern formed by the code elements 15*c*. Alternatively, the detectable intensity of the physical action variable of the code elements 15*c* can deviate distinctly from that of the encoder elements 3*c*, in the optical case therefore by means of the same light being modulated differently by different intense transmissivity or reflectivity of encoder elements 3*c* and code elements 15*c*. A differentiation can alternatively be achieved by means of light having different wavelengths, as illustrated in FIG. 3*b*.

FIG. 3*b* shows an arrangement for an embodiment according to FIG. 3*a* in which encoder elements and code elements are detected in each case optoelectronically, but using light having different wavelengths. The illustration shows a sectional view at right angles to the direction of extent (arrow E) of the sensor unit 4 or of the encoder 3 from FIG. 3*a*, along a sectional line B-B. Encoder elements 3*c* are detected by the encoder 3 being illuminated with light having a first wavelength $\lambda_1$, for which purpose for example an illumination unit 19*a* is arranged on the left at the sensor unit 4 in FIG. 3*b*. The light $\lambda_1$ is reflected by the encoder, radiates through the component 5 and is detected by the sensor 6*a* of the sensor unit 4. Code elements 15*c* are detected according to the shadow casting principle or alternatively using an imaging optical unit (not illustrated) by means of the transillumination of the scale 15 with light having a second wavelength $\lambda_2$, which can be differentiated from the first wavelength $\lambda_1$, for which purpose an illumination unit 19*b* is arranged on the right for example at the sensor unit 4 in the figure. In order to direct the light from the illumination unit 19*b* onto the scale 15 from below, the system 100 has an optical unit 17/18 comprising an L-shaped mirror carrier (clip) 18 with a mirror 17. The optical unit 17/18 and the illumination units 19*a*, 19*b* are movable together with the sensor unit 4 relative to the encoder 3. The component 5 with the scale is fashioned in such a way that it ideally does not influence light having the first wavelength $\lambda_1$, that is to say is transparent to light having the first wavelength $\lambda_1$, but the code elements 15c modulate light having the second wavelength $\lambda_2$ by virtue of the fact that the code elements 15c or conversely the remainder of the scale 15 are or is opaque to light having the second wavelength $\lambda_2$. For this purpose, the first wavelength $\lambda_1$ and the second wavelength $\lambda_2$ are for example in different spectral ranges, e.g. the first wavelength $\lambda_1$ is in the visible range and the second wavelength $\lambda_2$ is in the UV range, or respectively one wavelength in the visible range and the other in the IR range. Alternatively, both wavelengths $\lambda_1$ and $\lambda_2$ are in the same spectral range, but correspond to differentiable colors. If, as an alternative to the arrangement illustrated, the illumination units 19a and 19b are arranged behind the encoder 3, as seen from the sensor unit 4, encoder elements 3c being detected by means of transillumination, then the optical unit comprising a mirror carrier 17/18 can be dispensed with. Such an arrangement is advantageous in the case of embodiments having a static sensor unit 4 and movable encoder 3, wherein the illumination units 19a and 19b are moved together with the sensor unit 4 relative to the encoder 3. The encoder 3 or the encoder elements 3c are then embodied in such a way that they ideally do not influence light having the second wavelength $\lambda_2$, but modulate light having the first wavelength $\lambda_1$. Alternatively, in the case where the sensors 6a, b are embodied as area sensors, detection of encoder elements 3c that is undisturbed by the component 5 can be achieved by means of a specific shaping of the component 5. For this purpose, the component 5 or the cantilevers 25' and 25" is or are shaped so narrowly that the cantilevers 25' and 25" cover only a partial region of the sensor areas in an orthogonal direction (arrow Y) with respect to the direction of extent. In this case, the encoder 3 is either wider than the cantilevers 25' and 25" or arranged in a manner offset with respect thereto in said orthogonal direction (arrow Y), such that the encoder elements 3c are detectable by the sensors 6a,b past the component 5.

The embodiment according to FIG. 4 corresponds to that according to FIG. 3, except that the component 5 is modified in comparison with the embodiment according to FIG. 3a by virtue of the fact that the two cantilevers 25' and 25" are so short in the direction of extent (arrow E) that they cover only a small part of the detection region of the sensors 6a, 6b (areas 14' and 14"). Accordingly, the encoder elements 3c are detectable in an undisturbed manner with the large part of the detection region of the sensors 6a, b, independently of whether or not the sensors 6a,b are area sensors. In the present embodiment, what is used as a reference length for determining the sensor distance d is the entire length L of the scale 15 in the direction of extent (arrow E), in other words the distance between the scale ends 13, such that a position code is unnecessary. For this purpose, the length L of the scale 15 is known precisely as a result of the measurement by the manufacturer and is stored in the control and evaluation unit 2. A respective scale end 13 facing a sensor 6a, 6b is detectable by said sensor 6a, b in relation to the respective detection reference point R by virtue of the determination of the position of the projection area or of the projection line 14' or 14" of the scale end relative to the respective detection reference point R, as a result of which the sensor distance is determinable with the aid of the stored reference length L. In the case of an optoelectronic sensor unit 4, the scale ends and encoder elements 3c can be detected by means of identical light $\lambda$. For this purpose, illumination units 19 are arranged behind the encoder 3 as seen from the sensors 6a,b, for example. Alternatively, it is possible to use an arrangement as illustrated in FIG. 3b with illumination of the encoder 3 and of the mirror carrier 17/18, in particular with light having different wavelengths in each case. Encoder elements 3c are detected by means of transillumination. In the arrangement illustrated, the scale 15 is at least substantially opaque to the light $\lambda$ from the illumination units 19 or has markings on the scale ends 13 which modulate the light $\lambda$, for which reason the position of a scale end 13 is detected as a position of the dark area 14' or 14"—which represent a projection of a part of the scale 15—on the respective sensor 6a, b. The position of the areas 14' or 14" is determinable with the aid of the position of the bright-dark boundary line on the sensor 6a or 6b or with the aid of the position of a centroid of the entire area 14' or 14" on the sensor 6a or 6b. With the aid of the two detected positions of the scale ends 13 in the sensor field of the two sensors 6a,b and thus the distances thereof with respect to the respective detection reference point R, which corresponds to the distance in the direction of extent (arrow E) with respect to the dashed line 11, and with the aid of the stored scale length L, the current sensor distance or the distance between the detection reference points R is determined. In some embodiments, the cantilevers 25' and 25" have additional light-transmissive slots in order to further increase the precision of the sensor distance determination, as a result of which additional edge transitions occur in the region of the areas 14' or 14", which are likewise used for determining the sensor distance d.

If the sensors 6a, b are embodied as linear sensors or area sensors extending 5 mm to 10 mm in the direction of extent, then the distance d between the sensors 6a,b is for example in the range of 10 mm to 30 mm, preferably 20 mm±2 mm. The exact distance between the sensors, that is to say the sensor distance d, is defined or determined by means of the component 5. The measurement of the component 5 or of the component 5 and/or of the sensor distance d is carried out either before the incorporation of the component 5, of the sensors 6a, b or of the component 5 with the sensors 6a,b fixed thereto, or else on site by the user, wherein measurement of the component 5 is also understood to mean the measurement of its scale 15 or of its reference length.

The measurement is carried out highly precisely, i.e. with an error having an absolute value of at most $5 \cdot 10^{-6}$. Known methods can be used for this purpose, such as measurement by means of an interferometer, for example. The measured value or values is or are stored in the control and evaluation unit 2 of the system 100.

In the embodiments of a system 100 according to the invention for determining relative positions according to FIGS. 5 to 8, the material 5 composed of a dimensionally stable and aging-resistant material having a coefficient of thermal expansion having an absolute value in a range of 0 to at most $5 \cdot 10^{-6} K^{-1}$ serves in each case as a substrate by which the sensors 6a-c are positionally fixed. For higher precision demands, material having a lower coefficient of thermal expansion, such as, for example, having a coefficient of thermal expansion having an absolute value of $1 \cdot 10^{-6} K^{-1}$, or even better of $3 \cdot 10^{-7} K^{-1}$, is also advantageously used. The substrate is therefore such that its shape does not change or changes only slightly over the course of time and/or as a result of environmental influences such as the action of heat, for example, in contrast to substrates 27 according to the prior art. As a result of these properties of the material of which the component 5 and thus the substrate of a sensor unit according to the invention are composed, and the fixing of the position of the sensors 6a-c by means of the substrate 5, the distance d between the sensors 6a-c does not change either in a manner owing to age or as a result of environmental influences such as the action of heat, for example. The sensor distance d is thereby determined highly precisely with a relative error in the region of at most $5 \cdot 10^{-6}$, for even more precise measurement purposes of at most $1 \cdot 10^{-6}$, for extremely precise applications of at most $6 \cdot 10^7$. If the sensor units 4 have PCBs 20 which make electrical contact with and carry the sensors 6a-c, the connection between a sensor 6a-c and a PCB 20 is optionally embodied flexibly in such a way that a small displacement of a sensor 6a-c relative to the PCB 20 is possible in order to avoid or reduce mechanical stresses on account of thermally induced linear expansion. A connection via comparatively soft soldering contacts (via the ball grid arrays (BGAs) 7 in the examples) is effected for this purpose. This is advantageous particularly if sensor 6a-c and PCB 20 are produced from materials having significantly different coefficients of thermal expansion, as a result of which, with the use of a rigid fixing instead of a flexible connection, under the influence of heat, considerable mechanical stresses would occur at the sensor 6a-c or PCB 20. Alternatively, sensors 6a-c and PCB 20 are embodied rigidly in such a way that they can take up mechanical stresses without adversely affecting the system performance.

Figure 5:
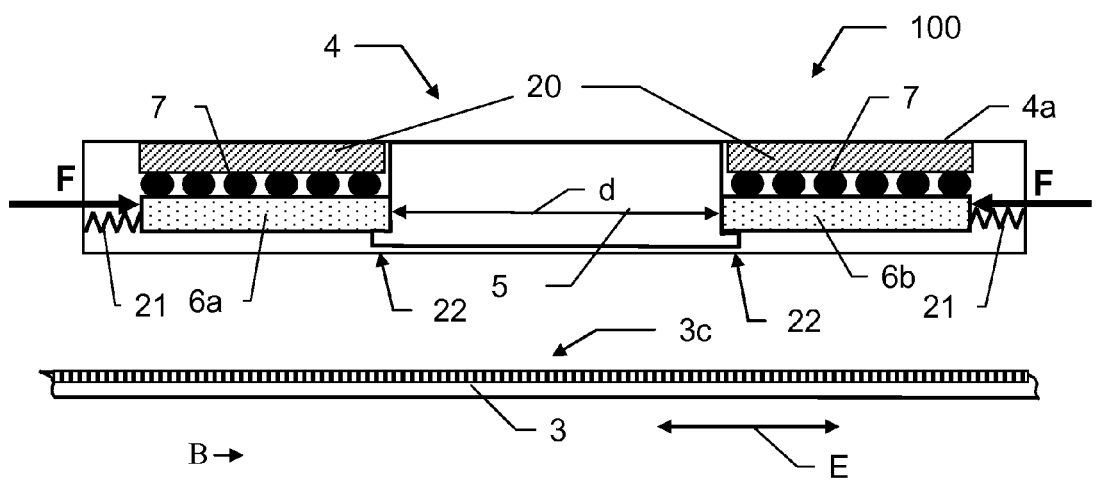
FIG. 5 shows a schematic illustration in side view of one embodiment of a system according to the invention comprising a component composed of a dimensionally stable and aging-resistant material, which fixes the sensors of the sensor unit in their positions.

FIG. 5 shows a lateral view of a system 100 according to the invention comprising encoder 3, sensor unit 4 having two sensors 6a,b, which are fixed to the PCB 20 by means of BGAs 7, and a component 5, which is fitted to the housing 4a of the sensor unit 4. The sensors 6a,b are fixed in terms of their distance with respect to one another laterally to stop at the component 5, serving as a position-fixing substrate. For this purpose, said sensors have applied to them in each case a force F in the direction of the component 5, such that they are pressed against the substrate in each case by their side facing one another. The application can be effected by means of a spring element 21, which is arranged between sensor 6a,b and housing 4a of the sensor unit 4, or by means of a clamping device, which is fixed to the component 5 at one end and, in a manner engaging around the respective sensor 6a,b, presses the latter onto the component 5. Alternatively, the sensors 6a,b can be fixed to the component 5 laterally by means of bonding. The sensors 6a,b are substantially held by the PCB 20. For better stability, however, the component 5, as illustrated, can be embodied as a parallelepiped with bearing edges 22 at the stop locations. If the component 5 has bearing edges 22, the latter, in an alternative embodiment similar to the embodiment according to FIG. 4, can additionally serve for determining the sensor distance d by means of a measurement with the aid of a scale 15 (not illustrated in FIG. 5) by virtue of the fact that the bearing edges 22 are detected by the sensors 6a,b and the distance between the outer ends of the bearing edges 22, which distance is stored in the control and evaluation unit 2, serves as the reference length. As an alternative to the embodiment illustrated, in which the component 5 and the PCBs 20 are not connected directly, the substrate 5 can also be fitted to the PCBs 20.

Figure 6A:
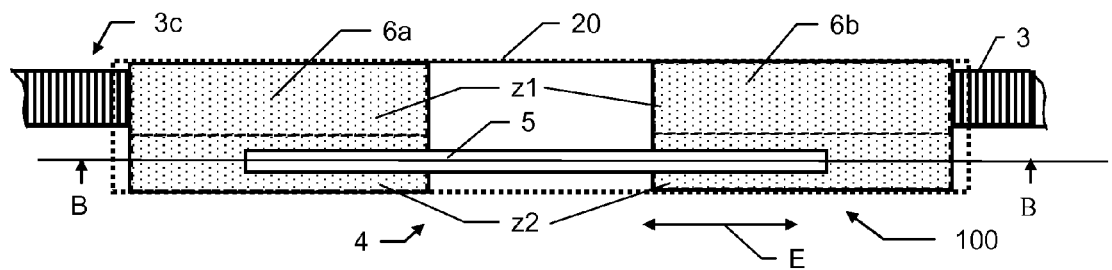
FIGS. 6a-c show a schematic illustration in plan view (FIG. 6a) and in sectional view (FIGS. 6b,c) of a second embodiment of a system according to the invention comprising a component composed of a dimensionally stable and aging-resistant material, which fixes the sensors of the sensor unit in their positions.
Figure 6B:
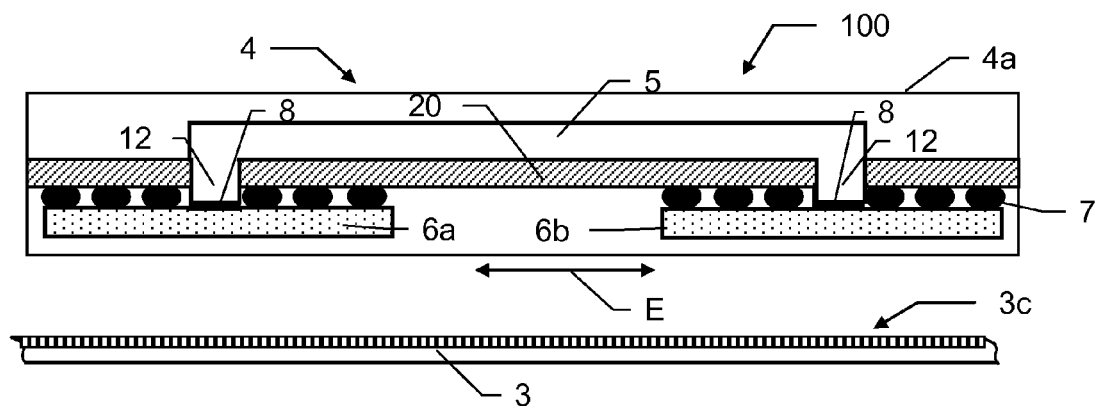

FIGS. 6a and 6b show a second embodiment of a system 100 according to the invention comprising a component 5 serving as a substrate.

FIG. 6a shows in a plan view the sensor unit 4 and the underlying encoder 3, partially concealed by the sensor unit 4. The sensor unit 4 has a PCB 20, which is merely indicated by a dashed line, two sensors 6a,b and the elongate component 5. The sensors 6a,b are produced in each case from a continuous material piece which is separated into a first zone z1 and a second zone z2. The first zone z1 is the actual sensor in the sense that it is designed for detecting encoder elements 3c. The second zone z2 is not sensitive, but rather serves as a fixing area for fixing to the component 5, as a result of which the two sensors 6a, 6b are positionally fixed in a manner spaced apart from one another.

FIG. 6b illustrates the system 100 according to FIG. 6a in side view along a sectional line B-B from FIG. 6a. It is evident that the component 5 is shaped as a kind of bridge having two pillars 12, such that it attaches to the sensors 6a,b by means of the pillars 12 through the PCB 20, the PCB 20 optionally being interrupted at this location. The sensors 6a,b are fixed to the pillars 12 preferably by means of bonding, wherein in alternative embodiments fixing is carried out by means of other processes, such as adhesive bonding or soldering. In the example, the bonding locations 8 are small in comparison with the sensor area, such that the fixing is virtually punctiform. This affords the advantage that, under the action of heat, mechanical stresses on account of thermal expansion of the sensors 6a,b fixed to the thermally stable component 5 are substantially avoided.

Figure 6C:
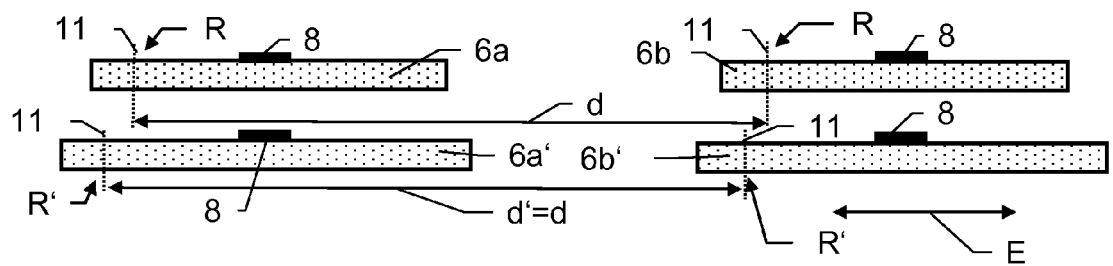

FIG. 6c shows a partial region of the system 100 according to FIGS. 6a and 6b, in which only the sensors 6a,b with their detection reference points R and the bonding locations 8 are illustrated. The elongated sensors 6a,b are positionally fixed with respect to one another at the bonding locations 8, as described. In the case of such sensors 6a, b extended in an elongate or planar fashion, said sensors can themselves still deform as a result of thermal expansion, for example, as a result of which they expand e.g. along the direction of extent (arrow E). This is illustrated by the two sensors 6a',b' in comparison with the non-expanded sensors 6a,b. If, as evident from FIG. 6c, the detection reference points R of the sensors 6a,b are at an equal distance from the bonding location 8 in the same direction and if the amount of expansion is identical for both sensors 6a,b (for which purpose the sensors 6a,b are advantageously structurally identical), then this does not influence the detection distance, since the positions of the detection reference points R change in each case identically in terms of absolute value and direction (new position in the expanded state of the sensors 6a',b' indicated by the detection reference point R' at the bottom in FIG. 6c). The detection distance, which exactly corresponds to the sensor distance d in the example, therefore remains constant (new sensor distance d' is equal to old sensor distance d, in each case illustrated as the distance between the dashed lines 11). A constant sensor distance d can alternatively be achieved by the bonding location 8 being chosen in each case such that the detection reference point R lies in each case in the region of the bonding location 8 and, consequently, is not displaced even upon deformation of a sensor 6a,b.

Figure 7:
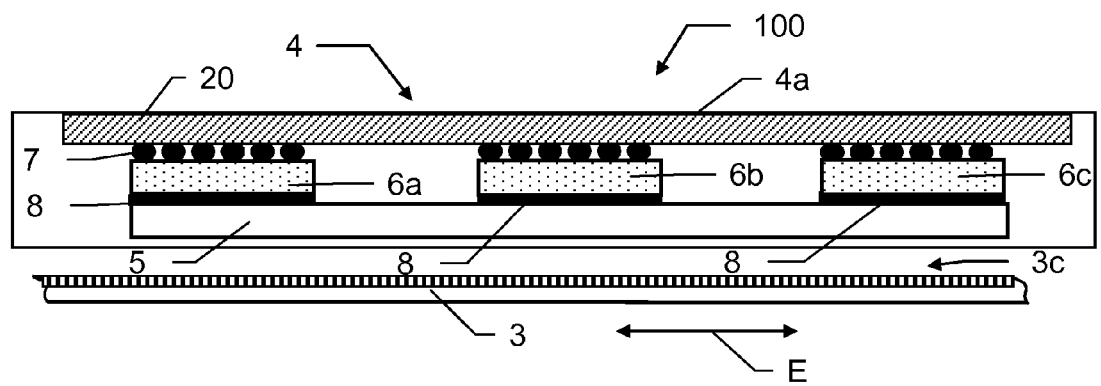
FIG. 7 shows a schematic illustration in side view of a further embodiment of a system according to the invention comprising a component composed of a dimensionally stable and aging-resistant material, which fixes the sensors of the sensor unit in their positions.

FIG. 7 shows a further embodiment of a system 100 according to the invention in side view comprising a sensor unit 4 having three sensors 6a-c. In order to fix the sensors 6a-c in their positions at a defined distance with respect to one another, they are fixed by their encoder-facing side on the component 5, serving as a substrate, by means of bonding. In this embodiment, the component 5 is not accorded a carrying function, rather it serves exclusively for the positional fixing of the sensors 6a-c along the direction of extent (arrow E). A bonding location 8 can be produced e.g. by anodic bonding or wafer bonding. Analogously to the embodiment according to FIGS. 3a,b, the component 5 and the bonding location 8 are such that they allow encoder elements 3c to be detected. In other words, component 5 and bonding location 8 are at least substantially transmissive to the physical action variable for the detection of the encoder elements 3c. For optoelectronic detection, the bonding location 8 is produced by means of anodic bonding for this purpose. Alternatively, the sensors 6a-c, analogously to the sensors 6a,b according to the previous embodiment in FIGS. 6a, 6b and 6c, can be divided into a first zone z1 for detecting the encoder elements 3c and a second zone z2 for bonding to the component 5, such that the detection region is free of substrate and fixing material. This additionally affords the advantage that damage to the sensitive region as a result of the bonding can be avoided more easily. In order to reduce or prevent mechanical stresses on account of the action of heat and linear expansion associated therewith, the sensors 6a-c are produced from materials which have a coefficient of thermal expansion the same as or similarly low to that of the component 5. In this case, in some embodiments, sensors 6a-c and component 5 are composed of the same material, the sensors 6a-c optionally being fixed to the component 5 by means of adhesive bonding or soldering instead of by means of bonding. Alternatively, the material and shape of the sensors 6a-c are chosen in such a way that the sensors 6a-c are dimensionally stable even under such stresses which can occur in the context of the possible temperature range of use, e.g. from 283K to 303K or from 253K to 343K.

Figure 8:
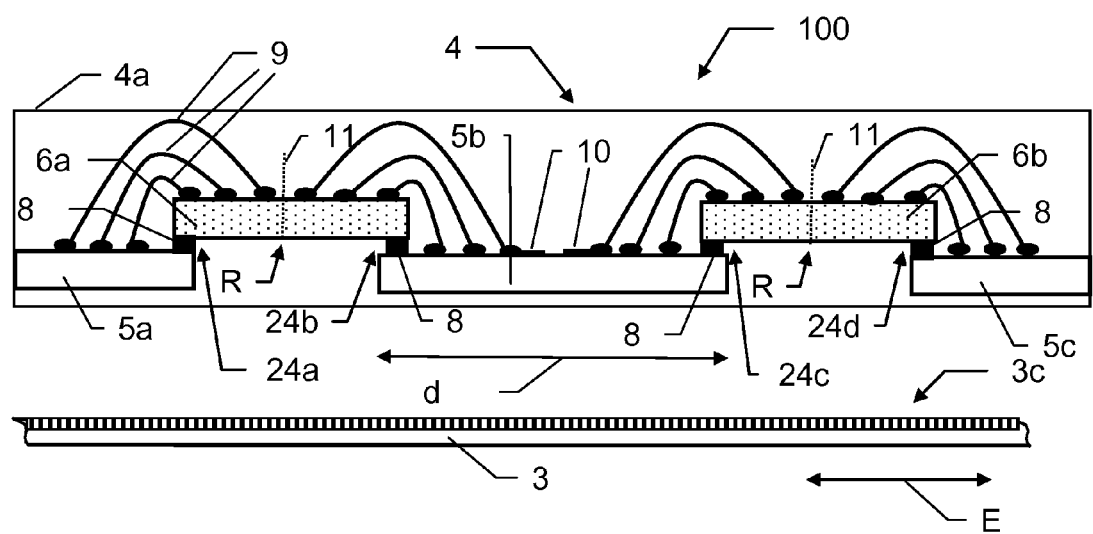
FIG. 8 shows a schematic illustration in side view of a further embodiment of a system according to the invention comprising a component composed of a dimensionally stable and aging-resistant material, which fixes the sensors of the sensor unit in their positions.

In the embodiment according to FIG. 8, the sensor unit 4 has three components 5a-c composed of a dimensionally stable and aging-resistant material, by which the sensors 6a,b are positionally fixed, the detection reference points R of said sensors lying in the sensor center in the example. For this purpose, the sensors 6a,b are fixed to the components 5a-c in each case by an edge region 24a-d by means of bonding locations 8. In addition to the positional fixing, the components 5a-c also serve for carrying and electrically connecting the sensors 6a, b. For this purpose, the electrical connections of the sensors 6a,b are connected, in the example by means of wire bonds 9, to electrical conductor tracks 10 of the components 5a-c. In order to reduce or prevent mechanical stresses on account of the action of heat and linear expansion associated therewith, the sensors 6a,b are produced from materials which have a coefficient of thermal expansion the same as or similarly low to that of the component 5. Alternatively, the material and shape of the sensors 6a,b are chosen in such a way that the sensors 6a,b withstand even such stresses which can occur on account of thermal changes in shape. As a further alternative, the sensors 6a,b are designed in such a way that they deform in a defined manner such that detection of encoder elements 3c is not adversely affected, preferably such that curving takes place whilst maintaining the sensor symmetry, with the dashed lines 11 as axis of symmetry. In this case, it is advantageous to carry out the bonding of the sensors 6a,b at a temperature which corresponds to the lower limit of the intended temperature range of use, e.g. 253 K. As a result, only the possibility of an expansion, but not of shrinkage of the sensors 6a,b need be taken into account. Alternatively or additionally, the system 100 has means for heating and/or cooling the sensor unit 4 in order to influence the temperature of the sensor unit 4 in a targeted manner and e.g. to keep it constant at room temperature (293K).

In one alternative embodiment, the length of the component 5b, in a manner similar to the embodiment according to FIG. 4, additionally serves for determining the sensor distance d with the aid of a scale by virtue of the fact that the ends of the component 5b are detected by the sensors 6a,b in relation to the detection reference points R. In this case, the length of the component 5 serves as a scale defining a reference length and is stored in the control and evaluation unit 2. In another alternative embodiment, the two outer components 5a and 5c are replaced by conventional PCBs 20 and the sensors 6a,b are positionally fixed to the component 5b only by the mutually facing edge regions 24b and 24c. The sensor distance d is determined highly precisely by virtue of the fact that in this case the detection reference points R are situated at the edge regions 24b and respectively 24c (this arrangement is not illustrated in FIG. 8), and so the detection or sensor distance is constant as a result of the fixing of the edge regions 24b, c to the component 5. Instead of three individual components 5a-c, the sensor unit 4 in a further alternative embodiment has a single component 5, which extends from one side of the housing to the other and to which the sensors 6a, b are fixed by their encoder-facing side. In order then to enable encoder elements 3c to be detected, the solutions concerned with the analogous case from FIG. 7 are employed. In a further alternative embodiment, an elongated component 5 mentioned above is used in order to fix the sensors 6a,b thereto by their sides facing away from the encoder, instead of by their encoder-facing sides, by means of bonding locations 8 and thereby to fix them in their position relative to one another. In this case, the component 5 once again adopts the function of a printed circuit board, for which purpose the sensors 6a,b are in electrical contact with conductor tracks 10 on the component 5 for example by means of wire bonds 9 or BGAs 7.

Figure 9:
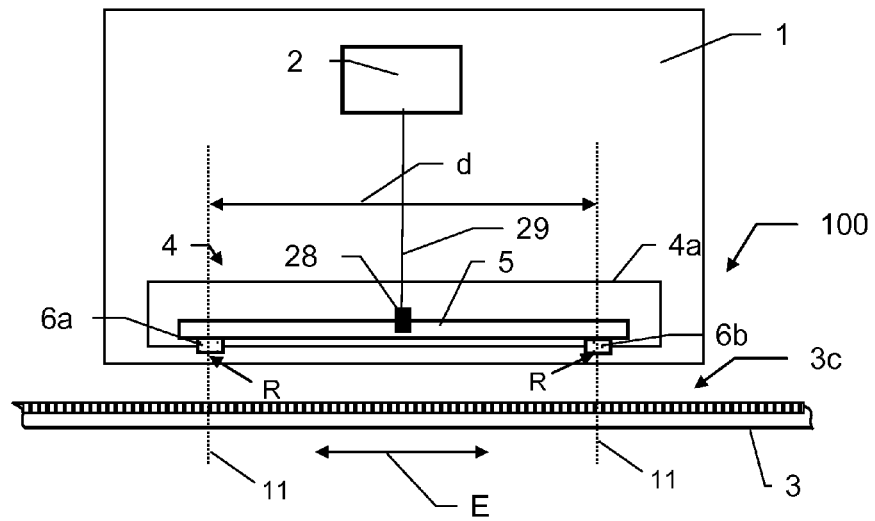
FIG. 9 shows a schematic illustration in side view of a system according to the invention as part of a measuring device comprising a component composed of a dimensionally stable and aging-resistant material and a thermometer for determining the temperature of the component.

FIG. 9 shows a schematic illustration of a system 100 according to the invention as part of a measuring device for applications in which even tiny changes in length, such as are still possible in the case of a component 5 having a coefficient of thermal expansion of at most $5 \cdot 10^{-6} K^{-1}$, are problematic. For this purpose, the system 100 has, besides the component 5 composed of a dimensionally stable and aging-resistant material, which serves for determining the distance between the sensors 6a,b by means of positional fixing of the sensors 6a,b and/or by means of the measurement of the sensor distance d, a thermometer 28 for measuring the temperature of the component 5. According to the invention, in the present embodiment, a correction value stored for the measured temperature is taken into account when determining the sensor distance d, which correction value takes account of the change in length of the component 5 at said measured temperature. Even more precise measurement results for the sensor distance d and thus for the position determination between sensor unit and encoder can be obtained in this way. The thermometer 28 is connected to the control and evaluation unit 2 by means of a communication connection 29, such that the temperature of the component 5 is determinable by the control and evaluation unit 2 by means of the thermometer 28, preferably with an accuracy of ±0.1K. If the component 5 has a low thermal conductivity, such that non-negligible temperature gradients can occur at the component 5, the system optionally has a plurality of thermometers 28 for determining the temperature at a plurality of locations of the component 5, either an average temperature value or individual temperatures for individual component sections being determined. In the present embodiment, the sensor distance d is determined with the aid of the component 5 as described further above and, in addition, the current temperature of the component 5 is determined and taken into account in this case, for which purpose recourse is had to information stored in the control and evaluation unit 2 and describing the thermal expansion behavior of the component 5 depending on the temperature thereof. Such information includes tables of values or parameters of computation specifications describing the temperature dependence of the length of the component 5, of the sensor distance d or of the coefficient of thermal expansion of the component material, or the temperature dependence of the relative or absolute change in the length of the component 5, of the sensor distance d or of the coefficient of thermal expansion of the component material, optionally in relation to a reference temperature.

Depending on the embodiment, from the measured temperature or from the average temperature value or from the individual temperatures and the stored information, a correction value for the sensor distance d is ascertained directly by recourse being had to a stored value assigned to the measured temperature. Alternatively, such a correction value is calculated in a further step with the aid of a computation specification for the measured temperature, said computation specification being stored in the control and evaluation unit 2. In the case of a system 100 in which the component 5 serves for positional fixing, the value of the sensor distance d stored in the control and evaluation unit 2 is adapted with the aid of the correction value. If the component 5 has a scale 15, either the reference lengths assigned to the scale 15 or, given the presence of a position code 15, the position values assigned to the code elements 15c are corrected with the aid of the correction value or a sensor distance d determined with the aid of an uncorrected reference length is subsequently adapted with the aid of the correction value.

Alternatively or additionally, the system 100 has at least one thermometer 28 for determining the temperatures of the sensors 6a,b, and the temperatures of the sensors 6a,b are used when determining the sensor distance d analogously to the above-described process of taking account of the temperature of the component 5.

Furthermore, alternatively or additionally, the system 100 has a heating or cooling unit, which can be used to set the temperature of the component 5 and/or of the sensors 6a,b. Purposefully setting the temperature or keeping the temperature constant in such a way prevents or compensates for changes in the sensor distance d that are caused by the undesirable action of heat.

Figure 10A:
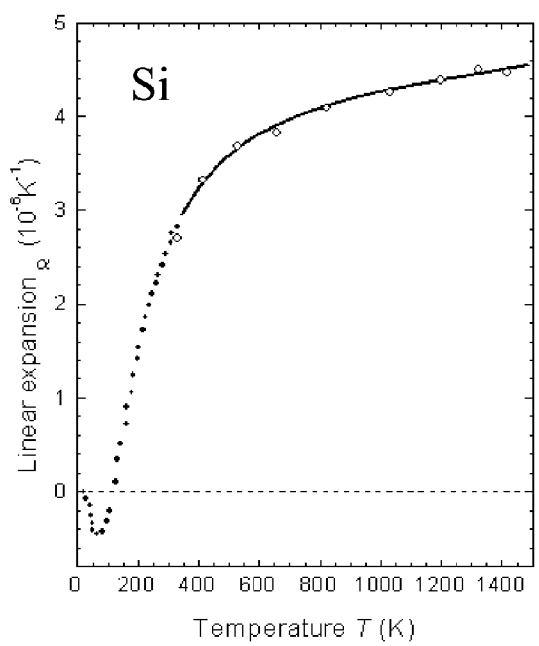
FIGS. 10a,b show the temperature-dependent profile of the coefficient of thermal expansion of two component materials.
Figure 10B:
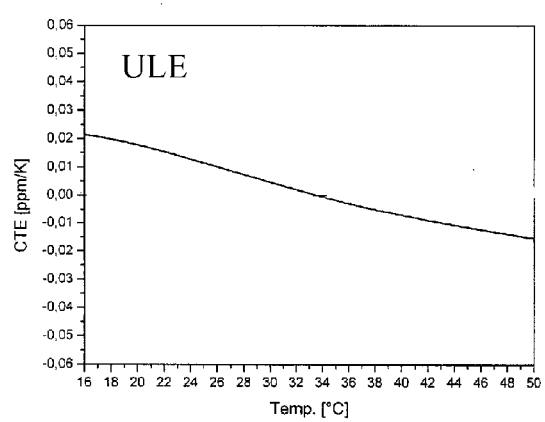

By means of the above-explained use of a thermometer 28 or of a heating or cooling unit, it is possible to use simple silicon, for example, as material for the component 5, which has at room temperature a coefficient of thermal expansion of approximately $3 \cdot 10^{-6}$ at the upper end of the specified range, and which additionally has a discernible temperature dependence in a wide temperature range, as is illustrated in FIG. 10a. Contrasted therewith, the profile of the coefficient of thermal expansion (CTE) as a function of the temperature (Temp.) of an Ultra-Low Thermal Expansion (ULE) material is shown in FIG. 10b. Such a ULE material exhibits only small fluctuations of the coefficient of thermal expansion, which affords advantages for the use as material for the component 5 particularly in embodiments without temperature determination. What is advantageous about the use of silicon as material for the component 5 serving as a substrate is that an embodiment as described with regard to FIG. 7 can thus be realized in a simple manner, in which embodiment component 5 and sensors 6a-c are produced from identical material in order to avoid thermally governed stresses with identical coefficients of thermal expansion, since cost-effective sensors suitable for the system are produced from silicon.

As an alternative to all the embodiments described, it is conceivable for measured values for the determination of the sensor distance d to be communicated to an external computer by a communication unit of the measuring device, said external computer performing the calculation of the sensor distance d with the aid of the measured values instead of the control and evaluation unit 2 and optionally transmitting it back to the measuring device.

What is claimed is:

1. A system for determining relative positions comprising an encoder having encoder elements and an electronic sensor unit, wherein:
   the sensor unit and encoder are movable relative to one another in a direction (E) of extent; and
   the sensor unit has a first sensor and at least one further, second sensor, wherein the first sensor and the second sensor have with respect to one another a sensor distance (d) in the direction (E) of extent, said sensor distance being dimensioned in such a way that at least one encoder element is detectable by the first sensor and at least one other encoder element is detectable by the second sensor,
   wherein the system has a component serving as a reference and produced from a dimensionally stable and aging-resistant material having a coefficient of thermal expansion having an absolute value in a range of 0 to at most $5 \times 10^{-6} K^{-1}$, wherein the sensor distance (d) is determinable highly precisely by using the component.

2. The system according to claim 1, wherein:
   the component has a scale, which extends in the direction (E) of extent and defines a highly precise reference length, wherein the reference length has a relative error in the region of at most $5 \times 10^{-6}$.

3. The system according to claim 1, wherein:
   the component has a scale, which extends in the direction (E) of extent and defines a highly precise reference length, wherein the reference length has a relative error in the region of at most $1 \times 10^{-6}$.

4. The system according to claim 1, wherein:
   the component has a scale, which extends in the direction (E) of extent and defines a highly precise reference length, wherein the reference length has a relative error in the region of at most $5 \times 10^{-7}$.

5. The system according to claim 2, wherein:
   the length of the scale in the direction (E) of extent is equal to the reference length, wherein the scale is arranged in such a way that, for the highly precise determination of the sensor distance (d), one scale end is detectable by the first sensor and the second scale end is detectable by the second sensor.

6. The system according to claim 1, wherein:
   the component has a scale and the scale has a position code having code elements in the direction (E) of extent and the distance between code elements serves as the reference length, wherein the component is arranged in such a manner that the code elements of the position code of the component are detectable by the first sensor and by the second sensor and the encoder with its encoder elements is arranged in such a manner that the encoder elements are also detectable by the first sensor and by the second sensor;
   wherein the position code with the code elements is configured in such a way that in one step, for the highly precise determination of the sensor distance at least one code element is detectable by the first sensor and at least one other code element is detectable by the second sensor.

7. The system according to claim 1, wherein:
   the component for the highly precise determination of the sensor distance (d) serves as a substrate which fixes the first sensor and the second sensor in terms of their position with respect to one another in a manner spaced apart from one another, the dimensions of the component or the sensor distance (d) being determined highly precisely with a relative error in the region of at most $5\times10^{-6}$, by the manufacturer before incorporation of the sensor unit, and the dimensions of the component or the sensor distance (d) measured by the manufacturer are stored in a control and evaluation unit of the system for further calculations in connection with determining relative positions.

8. The system according to claim 1, wherein:
the component is arranged on the sensor unit and, at least a part of the component is arranged between the sensors and the encoder.

9. The system according to claim 1, wherein:
the first sensor and the second sensor bear laterally on the component and the sensor unit has a spring and/or clamping device, by which the first sensor and the second sensor have spring force applied to them in the direction of the component and they are kept pressed against the component and/or the sensors are fixed to the component by that side by which they bear laterally on the component.

10. The system according to claim 1, wherein:
the first sensor is divided into a first zone (zl) and a second zone (z2) and the second sensor is divided into a first zone (zl) and a second zone (z2), wherein the first zone (zl) of each sensor is designed for detecting encoder elements and the second zone (z2) of each sensor is fixed to the component.

11. The system according to Claim 6, wherein:
the component is arranged at one end of the encoder.

12. The system according to claim 1, wherein:
the system has a thermometer for determining the temperature of the component and/or of the sensors,
further information about the thermal expansion behavior of the component and/or of the sensors depending on the temperature is stored in a control and evaluation unit of the system,
and the control and evaluation unit is programmed in such a way that the sensor distance (d) is also determined with the aid of the thermometer-determinable temperature of the component and/or the sensors and with the aid of the information stored in the control and evaluation unit.

13. The system according to claim 1, wherein:
the sensor distance (d) is in the range of 1 mm to 100 mm.

14. The system according to claim 1, wherein:
the sensor distance (d) is in the range of 5 mm to 50 mm.

15. The system according to claim 1, wherein:
the sensor distance (d) is in the range of 10 mm to 30 mm.

16. The system according to claim 1, wherein:
the sensor distance (d) is in the range of 20 mm ±2 mm.

17. The system according to claim 1, wherein:
the system is designed for the optoelectronic, inductive-electronic or capacitive-electronic determination of relative positions.

18. The system according to claim 1, wherein:
the coefficient of thermal expansion of the dimensionally stable and aging-resistant material does not exceed the absolute value of $5\times10^{-6}$ $K^{-1}$, at least within a temperature range of 253K to 343K.

19. The system according to claim 1, wherein:
the coefficient of thermal expansion of the dimensionally stable and aging-resistant material does not exceed the absolute value of $5\times10^{-6}$ $K^{-1}$, at least within a temperature range of 288K to 303K.

20. The system according to claim 1, wherein:
the coefficient of thermal expansion of the dimensionally stable and aging-resistant material does not exceed the absolute value of $5\times10^{-6}$ $K^{-1}$, at least within a temperature range of 291K to 295K.

21. The system according to claim 1, wherein:
the sensor distance (d) is defined independently of the distance between encoder elements or groups of encoder elements.

22. The system according to claim 1, wherein:
the system is designed as a linear encoder system.

23. A method for highly precisely determining a sensor distance between a first sensor and a second sensor, the first sensor and second sensor being to sensors,
the two sensors are arranged in a fixed relative position to each other,
the two sensors being part of a system for determining relative positions by moving the two sensors commonly relative to an encoder having encoder elements, whereby the first sensor detects a first encoder element and the second sensor detects a second encoder element and the detection of the two encoder elements by the two sensors occurs in on step, and wherein the highly precisely determined sensor distance can be used for further calculations in connection with determining relative positions, and wherein:
a component is provided, which component is made of a dimensionally stable and aging-resistant material having a coefficient of thermal expansion having an absolute value in the range of 0 to at most $5\times10^{-6}K^{-1}$, and
the component serves as a substrate which fixes the first sensor and the second sensor in terms of their position with respect to one another, and the sensors are fixed on two sides of the component, and the component is measured highly precisely and the measured value or values is or are stored in a control and evaluation unit of the system, so that the distance between said two sides of the component where the sensors are fixed on is known from the measurement of the component; and/or
the distance between the sensors fixed to the component is measured highly precisely and is stored in the control and evaluation unit; and/or
the component has a scale defining a reference length, wherein the reference length is measured highly precisely; and wherein:
the length of the scale is the reference length and, for determining the sensor distance (d), one scale end is detected by the first sensor and the second scale end is detected by the second sensor; and/or
the scale has a position code having code elements, wherein the distance between code elements serves as the reference length and, for determining the sensor distance (d), at least one code element is detected by the first sensor and at least one code element is detected by the second sensor.

24. Method according to claim 23, wherein:
the temperature of the component and/or of the sensors is measured and the measured temperature is taken into account when determining the sensor distance (d) with the aid of information stored in the control and evaluation unit.

25. One or more non-transitory computer-readable media storing one or more programs that are configured, when executed, to cause one or more processors to execute the method as recited in claim 23.

\* \* \* \* \*